US008553892B2

(12) United States Patent
Lindahl et al.

(10) Patent No.: US 8,553,892 B2

(45) Date of Patent: Oct. 8, 2013

(54) PROCESSING A MULTI-CHANNEL SIGNAL FOR OUTPUT TO A MONO SPEAKER

(75) Inventors: Aram Lindahl, Menlo Park, CA (US); Joseph M. Williams, Dallas, TX (US); Gints Valdis Klimanis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 934 days.

(21) Appl. No.: 12/683,196

(22) Filed: Jan. 6, 2010

(65) Prior Publication Data

US 2011/0164770 A1 Jul. 7, 2011

(51) Int. Cl.
*H04R 5/00* (2006.01)
*H04B 3/00* (2006.01)

(52) U.S. Cl.
USPC .......... 381/1; 381/77

(58) Field of Classification Search
USPC .......... 381/1, 17, 18, 11, 77, 97, 98, 309
See application file for complete search history.

(56) References Cited

U.S. PATENT DOCUMENTS 5,875,233 A * 2/1999 Cox .......... 379/88.07
5,883,962 A 3/1999 Hawks
6,642,876 B2 * 11/2003 Subramoniam et al. ...... 341/144
7,522,733 B2 4/2009 Kraemer et al.
7,853,023 B2 * 12/2010 Kim .......... 381/63
2005/0129248 A1 * 6/2005 Kraemer et al. .......... 381/11
2005/0213747 A1 9/2005 Popovich et al.
2005/0244019 A1 11/2005 Lallemand

FOREIGN PATENT DOCUMENTS

JP 54104804 A 8/1979

* cited by examiner

*Primary Examiner* — Mohammad Islam
*Assistant Examiner* — David Ton
(74) *Attorney, Agent, or Firm* — Blakely, Sokoloff, Taylor & Zafman LLP

(57) ABSTRACT

Systems, methods, and devices for processing an audio signal with two or more channels into a monaural signal are provided. For example, an electronic device configured to perform such techniques may include audio signal processing circuitry, which may receive a first audio channel signal and a second audio channel signal. Based on these signals, the audio signal processing circuitry may output a monaural signal as a sum or a difference of the first and second audio channel signals, or as a combination thereof, depending at least in part on a phase relationship between the first and second audio channel signals. Additionally or alternatively, the audio signal processing circuitry may adjust a timing relationship between the first and second audio channel signals depending at least in part on the phase relationship, before combining a proportion of the first and second audio channel signals.

15 Claims, 11 Drawing Sheets

PROCESSING A MULTI-CHANNEL SIGNAL FOR OUTPUT TO A MONO SPEAKER

BACKGROUND

The present disclosure relates generally to processing a stereo signal into a mono signal and, more particularly to processing a stereo signal into a mono signal with reduced phase cancellation.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Professionally-produced multi-channel audio, such as professionally-recorded music or audiobooks, typically may be recorded such that no components of the stereo audio signals are out of phase with the other. Thus, to play professionally-produced multi-channel audio on a monophonic (mono) speaker, the channels simply may be summed. Since all of the audio signals may be in phase with one another, all of the components of the audio signals may add to one another to produce a mono output signal.

Multi-channel amateur recordings and/or podcasts may not have been processed at the time of recording in the manner of such professionally-produced multi-channel audio. As such, certain frequency components of these multi-channel audio signals may be out of phase with one another. To obtain a mono audio signal from two multi-channel audio signals, only one signal may be output, but the resulting mono signal will not include any audio information contained in the other signal. If both signals are simply summed, however, phase cancellation of out-of-phase components may distort the resulting mono signal. Specifically, in-phase portions of the audio signals will add to one another, while out-of-phase portions of the audio signals will cancel each other out.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the presently disclosed subject matter relate to systems, methods, and devices for processing an audio signal with two or more channels into a monaural signal. In accordance with one embodiment, an electronic device configured to perform such techniques may include audio signal processing circuitry, which may receive a first audio channel signal and a second audio channel signal. Based on these signals, the audio signal processing circuitry may output a monaural signal as a sum or a difference of the first and second audio channel signals, or as a combination thereof, depending at least in part on a phase relationship between the first and second audio channel signals. Additionally or alternatively, the audio signal processing circuitry may adjust a timing relationship between the first and second audio channel signals depending at least in part on the phase relationship, before combining a proportion of the first and second audio channel signals.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate generally to techniques for processing a multi-channel audio signal into a mono audio signal with minimal phase cancellation. In particular, blindly summing two related channels of a multi-channel audio signal, such as the left (L) and right (R) channels of a stereo audio signal, may result in a nearly complete loss of important information due to phase cancellation. As such, present embodiments may produce a mono signal from a stereo signal by selecting a summation or subtraction of the L and R signals to reduce phase cancellation, adjusting the phase of the L or R signals to reduce phase cancellation, and/or correcting phase cancellation problems within certain frequency bands of the audio signals. The techniques for doing so may be carried out in hardware, software, firmware, or any combination thereof in an electronic device.

Figure 1:
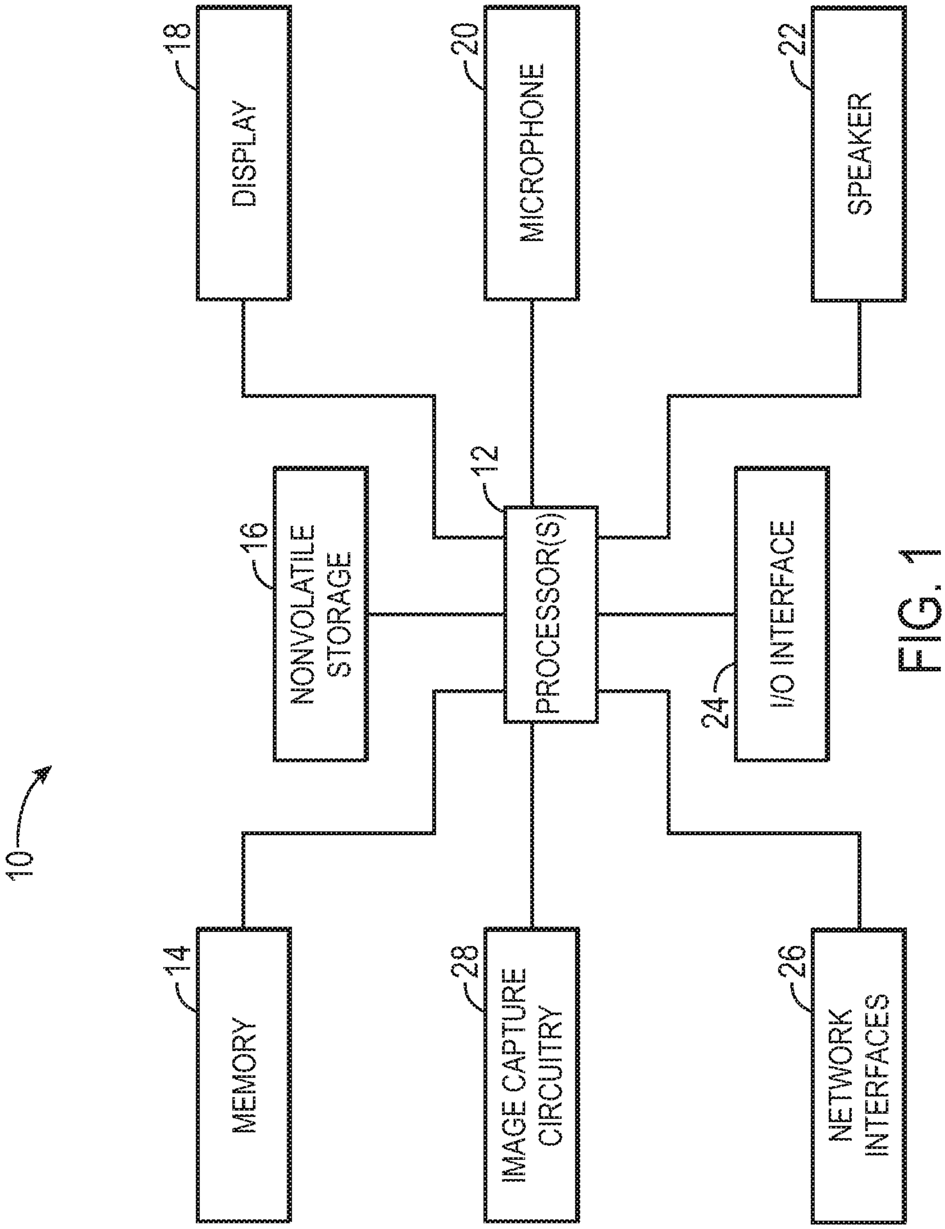
FIG. 1 is a block diagram of an electronic device configured to carry out the techniques disclosed herein, in accordance with an embodiment.
Figure 2:
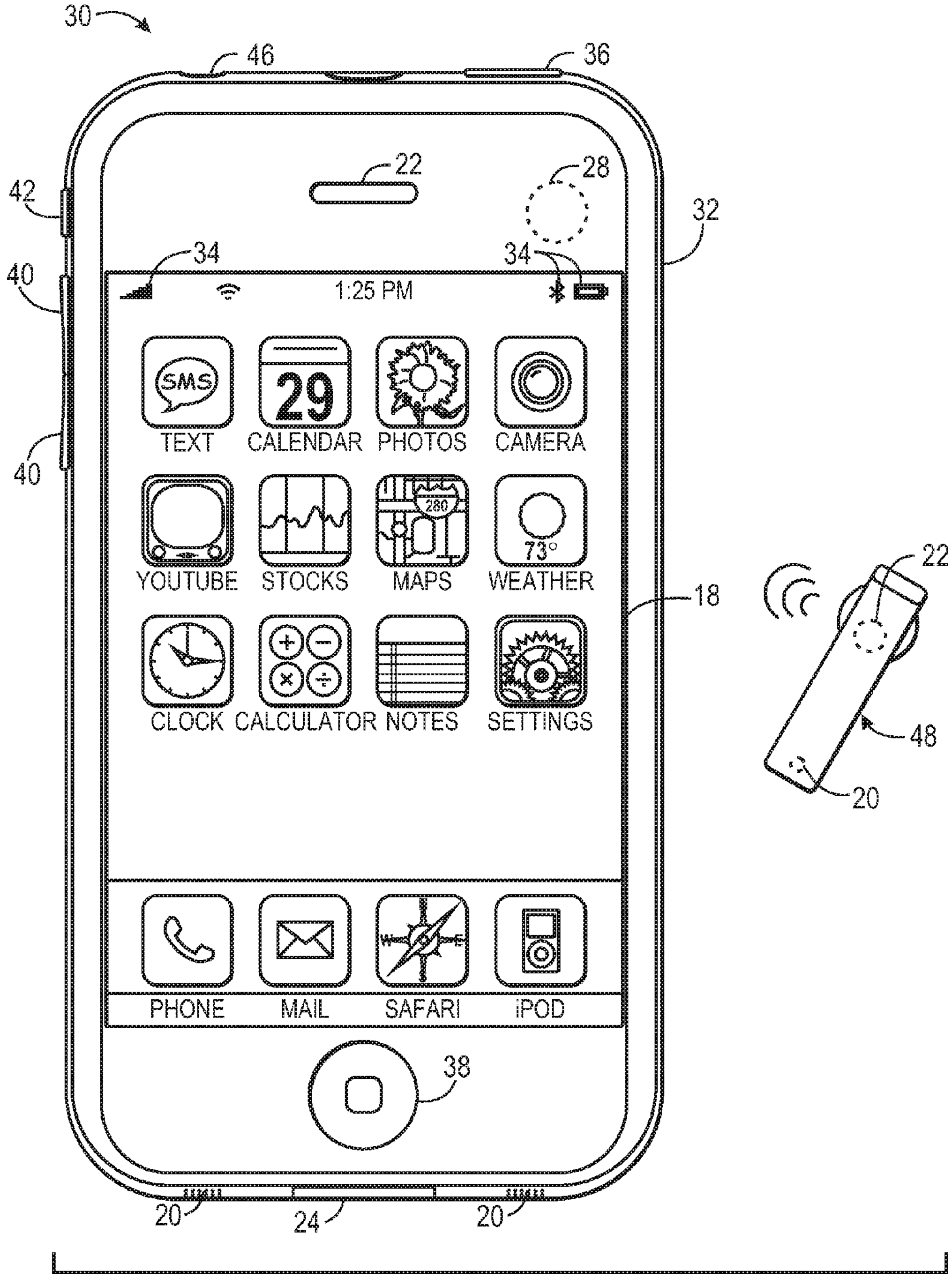
FIG. 2 is a schematic diagram of a handheld device representing an embodiment of the device of FIG. 1.

A general description of suitable electronic devices for performing the presently disclosed techniques is provided below. In particular, FIG. 1 is a block diagram depicting various components that may be present in an electronic device suitable for use with the present techniques. FIG. 2 represents one example of a suitable electronic device, which may be, as illustrated, a handheld electronic device having a stereo audio source, such as memory, audio processing capabilities, and/or an audio output device, such as a speaker.

Turning first to FIG. 1, an electronic device 10 for performing the presently disclosed techniques may include, among other things, processor(s) 12, memory 14, nonvolatile storage 16, a display 18, a microphone 20, a speaker 22, an input/output (I/O) interface 24, network interfaces 26, and image capture circuitry 28. The various functional blocks shown in FIG. 1 may include hardware elements (including circuitry), software elements (including computer code stored on a computer-readable medium) or a combination of both hardware and software elements. It should further be noted that FIG. 1 is merely one example of a particular implementation and is intended to illustrate the types of components that may be present in electronic device 10.

By way of example, the electronic device 10 may represent a block diagram of the handheld device depicted in FIG. 2 or similar devices. Additionally or alternatively, the electronic device 10 may represent a system of electronic devices with certain characteristics. For example, a first electronic device may include at least a stereo audio source, which may be, for example, memory 14, nonvolatile storage 16, or a stereo microphone 20, which may provide stereo audio to a second electronic device including the processor(s) 12 and/or other data processing circuitry. It should be noted that the data processing circuitry may be embodied wholly or in part as software, firmware, hardware, or any combination thereof. Furthermore, the data processing circuitry may be a single contained processing module or may be incorporated wholly or partially within any of the other elements within electronic device 10. The data processing circuitry may also be partially embodied within electronic device 10 and partially embodied within another electronic device wired or wirelessly connected to device 10. Finally, the data processing circuitry may be wholly implemented within another device wired or wirelessly connected to device 10. As a non-limiting example, data processing circuitry might be embodied within a headset in connection with device 10.

In the electronic device 10 of FIG. 1, the processor(s) 12 may be operably coupled with the memory 14 and the nonvolatile storage 16 to provide various algorithms for carrying out the presently disclosed techniques. Such programs or instructions executed by the processor(s) 12 may be stored in any suitable manufacture that includes one or more tangible, computer-readable media at least collectively storing the instructions or routines, such as the memory 14 and the nonvolatile storage 16. Also, programs (e.g., an operating system) encoded on such a computer program product may also include instructions that may be executed by the processor(s) 12 to enable the electronic device 10 to provide various functionalities, including those described herein. The display 18 may be a touch screen display, which may enable users to interact with the user interface of the electronic device 10. The microphone 20 may record stereo or mono audio. The speaker 22 may output mono audio.

The (I/O) interface 24 may enable the electronic device 10 to interface with various other electronic devices, as may the network interfaces 26. The network interfaces 26 may include, for example, interfaces for a personal area network (PAN), such as a Bluetooth network, for a local area network (LAN), such as in 802.11x Wi-Fi network, and/or for a wide area network (WAN), such as a 3G cellular network. Through the network interfaces 26, the electronic device 10 may interface with a wireless headset that includes a microphone 20 and a speaker 22. The image capture circuitry 28 may enable image and/or video capture.

When the electronic device 10 is used to play back a stereo audio signal on the mono speaker 22, the electronic device 10 may carry out the techniques disclosed herein to reduce phase cancellation that may otherwise occur if the two channels of stereo audio are simply combined blindly into a mono signal. In general, the stereo audio signal may derive from an audio file stored on the memory 14 or the nonvolatile storage 16 of the electronic device 10. Software running on the processor(s) 12 may receive the stereo audio signal and perform the various techniques described herein to produce a mono signal. This mono signal may be stored in the memory 14, the nonvolatile storage 16, and/or output by the speaker 22.

FIG. 2 depicts a handheld device 30, which represents one embodiment of the electronic device 10. The handheld device 30 may represent, for example, a portable phone, a media player, a personal data organizer, a handheld game platform, or any combination of such devices. By way of example, the handheld device 30 may be a model of an iPod® or iPhone® available from Apple Inc. of Cupertino, Calif.

The handheld device 30 may include an enclosure 32 to protect interior components from physical damage and to shield them from electromagnetic interference. The enclosure 32 may surround the display 18, which may display indicator icons 34. Such indicator icons 34 may indicate, among other things, a cellular signal strength, Bluetooth connection, and/or battery life. The (I/O) interfaces 24 may open through the enclosure 32 and may include, for example, a proprietary (I/O) course from Apple Inc. to connection to external devices. As indicated in FIG. 2, the reverse side of the handheld device 30 may include the image capture circuitry 28.

User input structures 36, 38, 40, and 42, in combination with the display 18, may allow a user to control the handheld device 30. For example, the input structure 36 may activate or deactivate the handheld device 30, the input structure 38 may navigate the user interface to a home screen, a user configurable application screen, and/or activate a voice-recognition feature of the handheld device 30, the input structures 40 may provide volume control, and the input structure 42 may toggle between vibrate and ring modes. The microphones 20 may obtain a users voice for various voice-related features, and a speaker 22 may output a signal mono audio signal that has been determined by the handheld device 30 from a stereo audio signal, based on the techniques described herein. A headphone input 46 may provide a connection to external speakers and/or headphones. In some embodiments, a wireless headset 48 may connection to the handheld device 30 via a wireless interface (e.g., a Bluetooth interface) of the network interfaces 26. The wireless headset 48 may include at least one microphone 20 and at least one speaker 22. The speaker 22 of the wireless headset 48 may similarly output a mono signal that has been determined by the handheld device 30 from a stereo signal.

Figure 3:
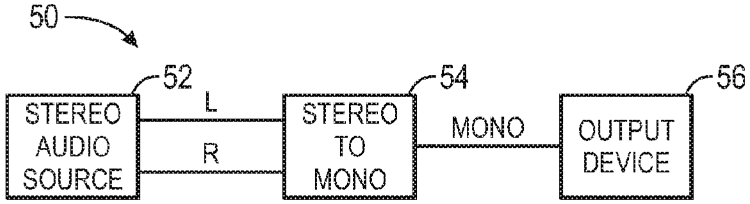
FIG. 3 is a block diagram depicting a stereo-to-mono processing system of the device of FIG. 1, in accordance with an embodiment.

FIG. 3 is a block diagram of a system 50 for converting a stereo audio signal into a mono audio signal using the electronic device 10 of FIG. 1. The system 50 may include a stereo audio source 52, which may include, among other things, a stereo microphone 20, a digital audio file stored on the memory 14 or nonvolatile storage 16 of the electronic device 10, and/or a digital audio file deriving from a networked data source. The stereo audio source 52 may provide two channels of audio, a left (L) channel and a right (R) channel, to a stereo-to-mono processing block 54. The stereo-to-mono block 54 may be implemented in hardware, such as a digital signal processor (DSP) of the electronic device 10, software running on the processor(s) 12, firmware associated with any suitable component of the electronic device 10, or any combination thereof. The stereo-to-mono block 54 may process the L and R audio signals to determine a mono output signal with reduced phase cancellation. The stereo-to-mono block 54 may determine the mono signal in a variety of manners, as described below. The mono signal output by the stereo-to-mono block 54 may be transmitted to an output device 56, which may include a mono speaker 22, memory 14 or nonvolatile storage 16, and/or a network device with a mono speaker, such as the wireless headset 48.

The disclosure below describes a variety of embodiments of the stereo-to-mono block 54 that may produce a mono signal from a stereo signal with reduced phase cancellation. As should be appreciated, the implementations of the stereo-to-mono block 54 may involve firmware associated with any suitable component of the electronic device 10, software running on the processor(s) 12 of the electronic device 10, hardware, such as a digital signal processor (DSP), or any combination thereof. In all cases, however, the L and R channels of the stereo signal may be mixed based on decisions regarding the in-phase or out-of-phase nature of the L and R channels.

Figure 4:
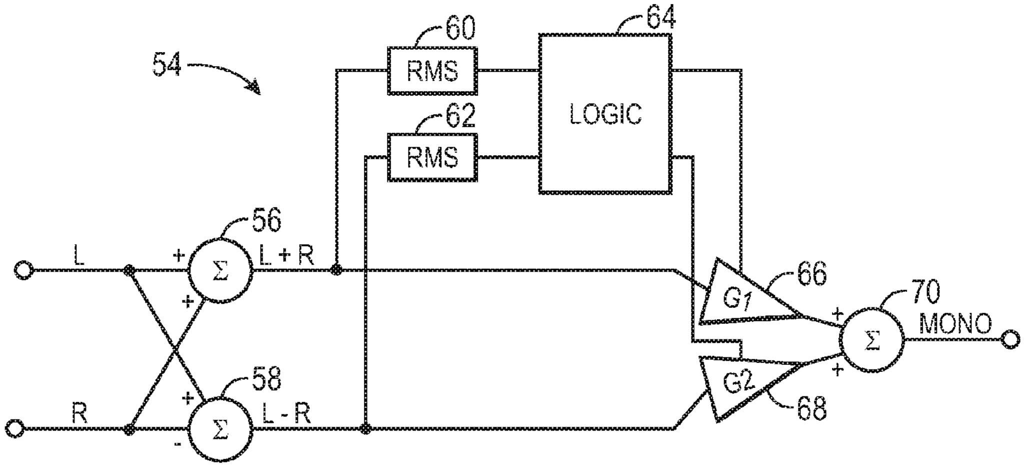
FIG. 4 is a schematic diagram of a process for stereo-to-mono signal determination for use with the system of FIG. 3, in accordance with an embodiment.

With the foregoing in mind, FIG. 4 represents one embodiment of the stereo-to-mono block 54 for use in the system 50 of FIG. 3. As noted above, the stereo-to-mono block 54 illustrated in FIG. 4 may be implemented using hardware, such as a digital signal processor (DSP) of the electronic device 10, software running on the processor(s) 12, firmware associated with any suitable component of the electronic device 10, or any combination thereof. In the stereo-to-mono block 54 of FIG. 4, the left (L) and right (R) channels may be summed in a summation block 56 and subtracted in a difference block 58 to respectively produce a summation signal (L+R) and a difference signal (L−R). In general, the more the L and R audio signals are in phase with one another, the greater the L+R signal may be relative to the L−R signal. Similarly, the more out-of-phase the L and R signals are to one another, the smaller the L+R signal may be relative to the L−R signal. This may occur because the out-of-phase frequency components of the L and R channels may cancel one another in the summation signal L+R but may add to one another in the difference signal L−R. Thus, merely outputting the summation signal L+R as the mono signal, without knowledge of the phase relationship between the L and R signals, may produce a signal that loses large quantities of meaningful information.

Certain characteristics of the L+R and L−R signals may be considered after the L+R and L−R signals are respectively passed through RMS blocks 60 and 62. In some embodiments, the L+R and L−R signals may be analyzed using a time-domain analysis, which may consider, for example, the root mean squared (RMS) power of the L+R and L−R. In other embodiments, the L+R and L−R signals may be analyzed using a frequency-domain analysis, such as a Fourier transform. In the discussion that follows, all RMS blocks may be understood, additionally or alternatively, to encompass other manners of signal analysis, including frequency-domain analyses such as Fourier transforms.

Due to the analysis undertaken in the RMS blocks 60, the output of the RMS blocks 60 and 62 may represent the loudness of the L+R and L−R signals. Logic 64 may compare the output of the RMS blocks 60 and 62 and, based on this comparison, the logic 64 may determine what proportion of each of the signals may be combined by adjusting gains G1 and G2 of gain blocks 66 and 68. The resulting signals may be summed in a summation block 70 to produce a single mono output audio signal. Several manners in which the logic 64 may adjust the gains G1 and G2, based, for example, on the RMS power or Fourier transform of the L+R and L−R signals, are described below with reference to FIGS. 5-8.

Figure 5:
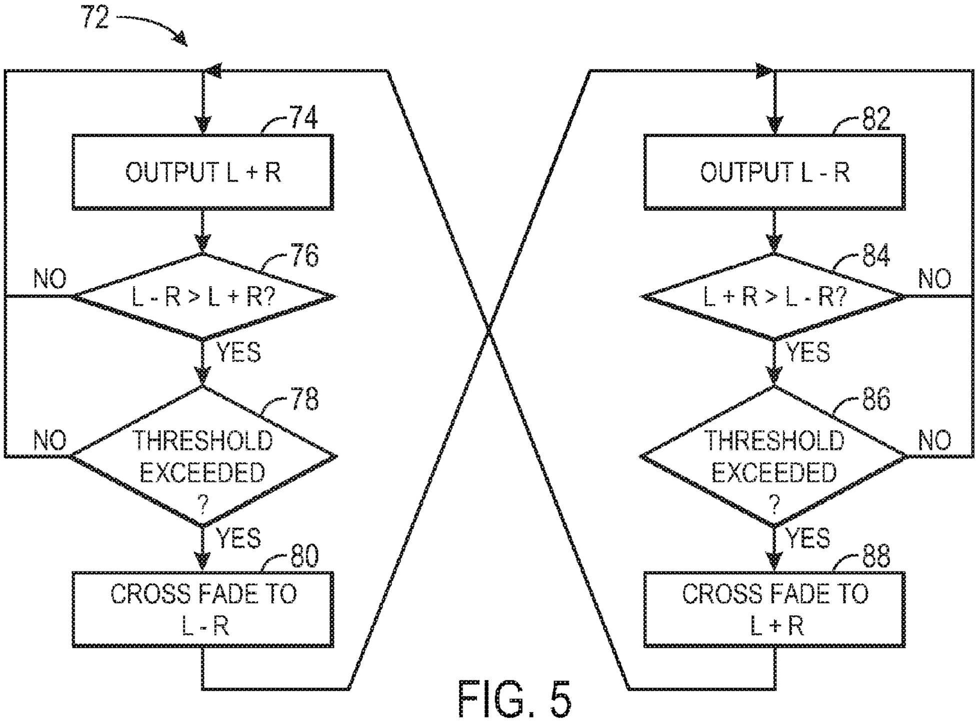
FIG. 5 is a flowchart describing an embodiment of a method for carrying out the process of FIG. 4.

Turning to FIG. 5, a flowchart 72 describes an embodiment of a method for operating the stereo-to-mono block 54 of FIG. 4. The flowchart 72 may begin, for example, at step 74, when the gains G1 and G2 of the gain blocks 66 and 68 have been selected such that substantially all of the L+R signal, and substantially none of the L−R signal, compose the output mono signal. As illustrated by decision blocks 76 and 78, if the RMS power or Fourier transform of the L−R signal exceeds that of the L+R signal for a threshold period of time or by a threshold amount of power, the process may flow to step 80. If not, the process may return to step 74. The test of the decision blocks 76 and 78 may take place periodically (e.g., every 10 ms, 20 ms, 50 ms, 100 ms, 200 ms, 500 ms, 1 s, 2 s, 5 s, and so forth) or continuously.

When the RMS power or Fourier transform level of the L−R signal exceeds that of the L+R signal, certain frequency components of the L and R signals may be more out-of-phase than in-phase. As such, in step 80, the logic 64 may control the gains G1 and G2 of the gain blocks 66 and 68 to gradually crossfade the output mono signal to include substantially only the L−R signal. The process of crossfading may take place over a period of time (e.g., 5 ms, 10 ms, 20 ms, 50 ms, 100 ms, 200 ms, 500 ms, 1 s, 2 s, 5 s, and so forth), which may be chosen based on human hearing and perceptibility.

After crossfading to the L−R signal in step 80, the stereo-to-mono block 54 may continue to output the L−R signal in step 82. According to decision blocks 84 and 86, if the RMS power or Fourier transform of the L+R signal exceeds that of the L−R signal for a threshold period of time or by a threshold amount of power, the process may flow to step 88. If not, the process may return to step 82, and the stereo-to-mono block 54 may continue to output substantially only the L−R audio signal as the mono output. As with decision blocks 76 and 78, the test of the decision blocks 84 and 86 may occur periodically or continuously.

When the RMS power or Fourier transform of the L+R audio signal exceeds that of the L−R audio signal, the L and R audio signals may have be substantially more in phase than out-of-phase. Thus, in step 88, the logic 64 may adjust the gains G1 and G2 of the gain blocks 66 and 68 over time to crossfade to output substantially only the L+R audio signal as the mono output signal. Accordingly, the process may return to step 74.

Figure 6:
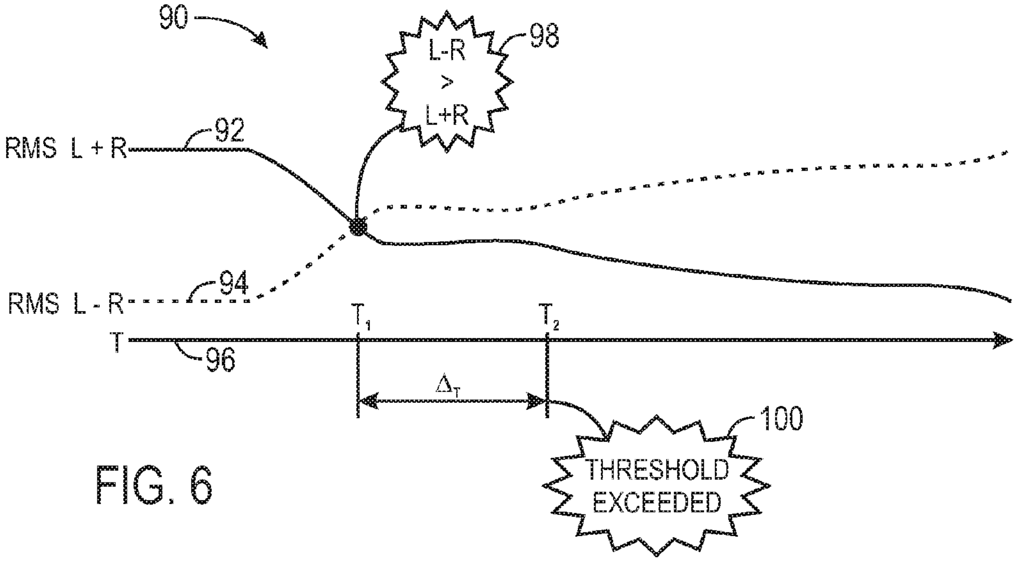
FIG. 6 is a schematic diagram representing a time threshold for use with the embodiment of the method of FIG. 5, in accordance with an embodiment.
Figure 7:
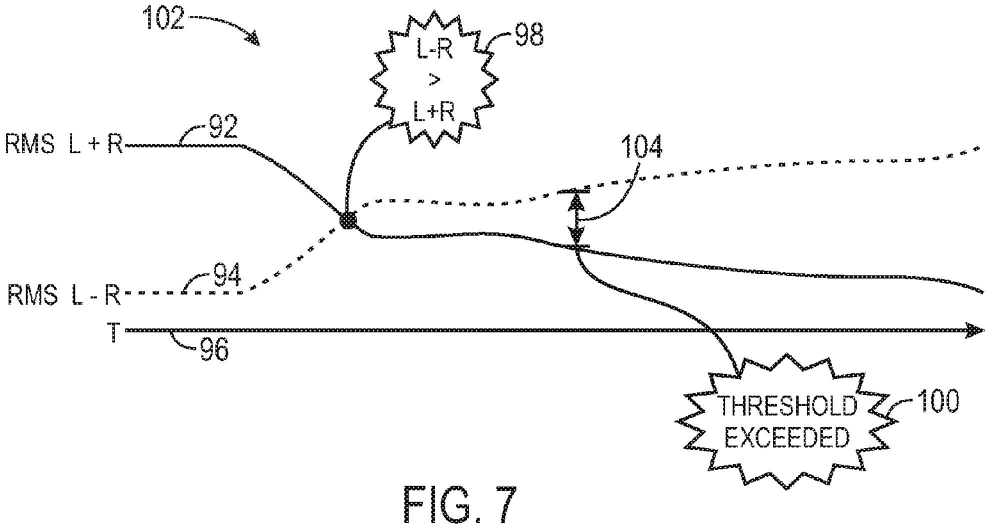
FIG. 7 is a schematic diagram representing a power threshold for use with the embodiment of the method of FIG. 5, in accordance with an embodiment.

As noted in decision blocks 78 and 86, the logic 64 may not crossfade as soon as the RMS or Fourier transform levels of either the L+R or L−R signal begin to exceed one another. Rather, the logic 64 may crossfade only after the L+R or L−R RMS power or Fourier transform levels have exceeded a threshold of time and/or quantity. FIGS. 6 and 7 respectively illustrate such thresholds of time and power.

Turning to FIG. 6, a threshold diagram 90 illustrates a manner of determining when a threshold of time has been exceeded, as particularly performed in decision block 78. In the threshold diagram 90, a curve 92 represents an RMS power level of the L+R audio signal and a curve 94 represents an RMS power level of the L−R audio signal. However, it should be understood that in some embodiments, rather than, or in addition to, RMS power, the curves 92 and 94 may represent Fourier transform values or values obtained through other manners of signal analysis. A timeline 96 illustrates elapsed time. In the threshold diagram 90, the RMS power level of the L−R audio signal 94 first exceeds that of the RMS power level of the L+R audio signal 92 at a time t1. After a threshold amount of time, Δt, has elapsed, the threshold has been exceeded, as illustrated by numeral 100.

Additionally or alternatively, the threshold tested in decision block 78 may include a threshold difference in RMS power, as shown by a threshold diagram 102 of FIG. 7. In the threshold diagram 102, a curve 92 represents the RMS power level of the L+R audio signal and a curve 94 represents an RMS power level of the L−R audio signal. In some embodiments, rather than, or in addition to, RMS power, the curves 92 and 94 may represent Fourier transform values or values obtained through other manners of signal analysis. A timeline 96 represents elapsed time. As noted in the threshold diagram 102, when the curve 94 exceeds that of the curve 92, the logic 64 may subsequently observe that the L−R audio signal has a greater RMS power than the L+R audio signal, as shown by numeral 98. When the difference between the curve 92 and 94 exceeds a power level threshold 104, the logic 64 may note that such a threshold has been exceeded, as shown by numeral 100.

Figure 8:
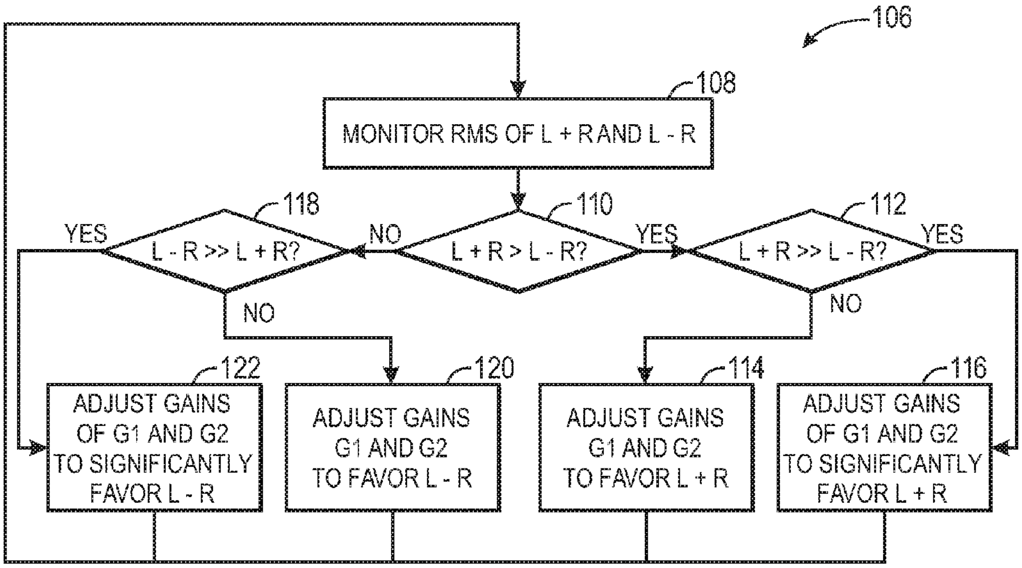
FIG. 8 is a flowchart describing an embodiment of a method for carrying out the process of FIG. 4.

While the embodiment of the method described above with reference to FIG. 5 generally involves crossfading to either the L+R audio signal or L−R audio signal, a flowchart 106 shown in FIG. 8 represents a manner of operating the stereo-to-mono block 54 of FIG. 4 with greater variability of gains G1 and G2. In particular, the flowchart 106 may begin as the logic 64 is monitoring the RMS power or Fourier transform levels of the L+R and L−R audio signals. As shown in decision blocks 110 and 112, if the RMS level of the L+R audio signal slightly exceeds that of the L−R audio signal, in step 114, the logic 64 may adjust the gains G1 and G2 of the gain blocks 66 and 68 to favor, slightly, the L+R audio signal as the primary component of the mono output signal (e.g., G1=0.55 to 0.75 and G2=0.45 to 0.25). If, however, as shown by the decision block 112, the RMS power or Fourier transform level of the L+R audio signal greatly exceeds that of the L−R audio signal, the logic 64 may adjust the gains G1 and G2 to favor the L+R audio signal in step 116 more significantly (e.g., G1=0.75 to 0.95 and G2=0.25 to 0.05).

On the other hand, as shown by decision blocks 110 and 118, if the L−R audio signal exceeds that of the L+R audio signal only slightly, the logic block 64 by adjust to gains G1 and G2 to slightly favor the L−R audio signal in step 120 (e.g., G1=0.45 to 0.25 and G2=0.55 to 0.75). If the power level of the L−R audio signal greatly exceeds that of the L+R audio signal, as shown in decision block 118, the logic block 64 may adjust to gains G1 and G2 to favor the R audio signal in step 122 more significantly (e.g., G1=0.25 to 0.05 and G2=0.75 to 0.95).

Figure 9:
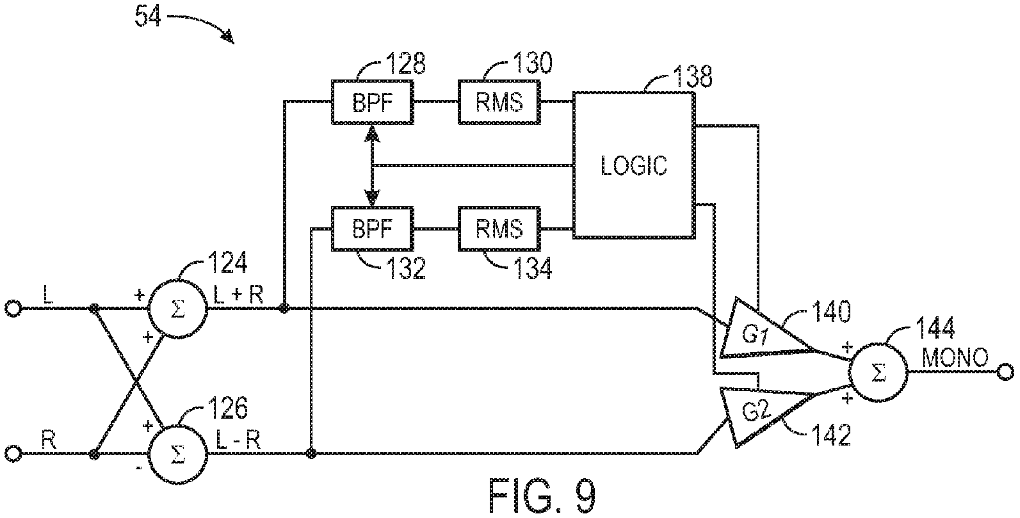
FIG. 9 is a schematic diagram of a process for stereo-to-mono signal determination for use with the system of FIG. 3, in accordance with an embodiment.

FIG. 9 represents another embodiment of the stereo-to-mono block 54 for use in the system 50 of FIG. 3. As noted above, the stereo-to-mono block 54 of FIG. 9 may be implemented using hardware, such as a digital signal processor (DSP) of the electronic device 10, software running on the processor(s) 12, firmware associated with any suitable component of the electronic device 10, or any combination thereof. In the stereo-to-mono block 54 of FIG. 9, the left (L) and right (R) channels may be summed in a summation block 124 to produce a summation signal (L+R) and may be differenced in a difference block 126 to produce a difference symbol (L−R). As also mentioned above, the more that the L and R signals are in-phase, the greater the L+R signal may be relative to the L−R signal. Similarly, the more out-of-phase the L and R signals may be, the greater the difference signal L−R may be relative to the L+R signal.

When a user of the electronic device 10 listens to an amateur audio recording, a user may be most interested in a particular frequency band. In particular, if the audio recording is a lecture or other voice audio recording, the user substantially only may be interested in a frequency band of the human voice. Similarly, if the audio recording is a genre of music, the user may be most interested in certain other frequency bands which may or may not encompass the same range of frequencies. As such, the embodiment of the stereo-to-mono block 54 illustrated in FIG. 9 may carry out the techniques for determining the mono signal described above, but with a particular emphasis on one or more particular frequency band of interest. That is, the stereo-to-mono block 54 may effectively reduce phase cancellation in the one or more frequency band of interest. To this end, the L+R audio signal may enter a band pass filter (BPF) 128 before entering a root mean squared (RMS) block 130. Similarly, the L−R audio signal may enter a BPF 132 before entering a similar RMS block 134. The resulting signals may be tested by logic 138.

The one or more frequency bands of the band pass filters 128 and 132 may or may not be dynamically selectable by the logic 138. In some embodiments of the stereo-to-mono block 54, the band pass filters 128 and 132 may represent static band pass filters for a specific predetermined range of frequencies, such as the frequency range of the human voice. Alternatively, the band pass filters 128 and 132 may be dynamically selectable by the logic 138. To this end, the logic 138 may tune the one or more frequency ranges permitted by the band pass filters 128 and 132 to specific ranges of frequencies of interest, based on the characteristics of the audio source. As described below, in some embodiments, the logic 138 may select the one or more frequency bands of the band pass filters 128 and 132 based on metadata that is associated with a digital audio source file from which the audio signal L and R derive. In certain other embodiments, the logic 138 may select the one or more frequency ranges of the band pass filters 128 and 132 based on a cancellation of background noise and isolation of subject audio, and may select one or more frequency bands of interest based on the frequency range of the subject audio.

Like the stereo-to-mono block 54 of FIG. 4, the stereo-to-mono block of 54 of FIG. 9 may similarly include two gain blocks 140 and 142 that may apply gains G1 and G2, respectively, to the L+R and L−R audio signals. The sum of these signals, added in a summation block 144, may represent the output mono signal. The logic 138 may adjust the gains G1 and G2 in the manners described above with reference to FIGS. 5-8. However, the mono output may include less phase cancellation in specific frequency bands of interest filtered by the band pass filters 128 and 132.

Figure 10:
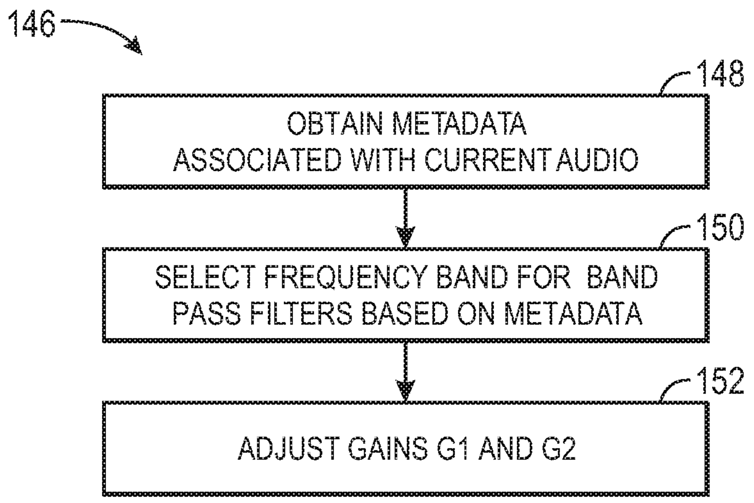
FIG. 10 is a flowchart describing an embodiment of a method for carrying out the process of FIG. 9.

FIG. 10 is a flowchart 146 that describes one embodiment of a method for operating the stereo-to-mono block 54 of FIG. 9. In a first step 148, the logic 138 or data processing circuitry, such as the processor(s) 12, may obtain metadata associated with the current stereo audio signal from which the L and R audio signals derive. Many audio files may include metadata, which may indicate, for example, a genre of audio, when and/or where the audio was recorded and/or produced, as well as an artist and/or title associated with the audio file. This metadata may enable the logic 138 to select one or more frequency bands for the band pass filters 128 and 132 that correspond to frequency bands of interest to a user of the electronic device 10.

In step 150, the logic 138 may consider certain elements of the metadata to the select the one or more frequency bands to be applied to the band pass filters 128 and 132. For example, the logic 138 may consider the genre of the audio file. Such a genre may include spoken word, rock, jazz, symphonic works, choral works, and so forth. In some embodiments, the genre may be more specific and may indicate, for example, whether the spoken word is male or female. Based on such metadata, the logic 138 may determine the one or more frequency bands by selecting one or more frequency bands specific to such a genre. By way of example, the one or more frequency bands selected when the metadata indicates the audio file is spoken word audio may include the typical speaking range of the human voice. If the metadata is more specific, the logic 138 may limit the frequency bands to encompass only male or female frequency ranges, for example. In other embodiments, the logic 138 may consider other metadata, such as the artist and/or title of the audio file. The electronic device 10 may access a network (e.g., the Internet) to determine the genre of the audio file based on the artist and/or title. In step 152, the logic 138 may adjust the gains G1 and G2 of the gain blocks 140 and 142 in the manners described above with reference to FIGS. 5-8.

Figure 11:
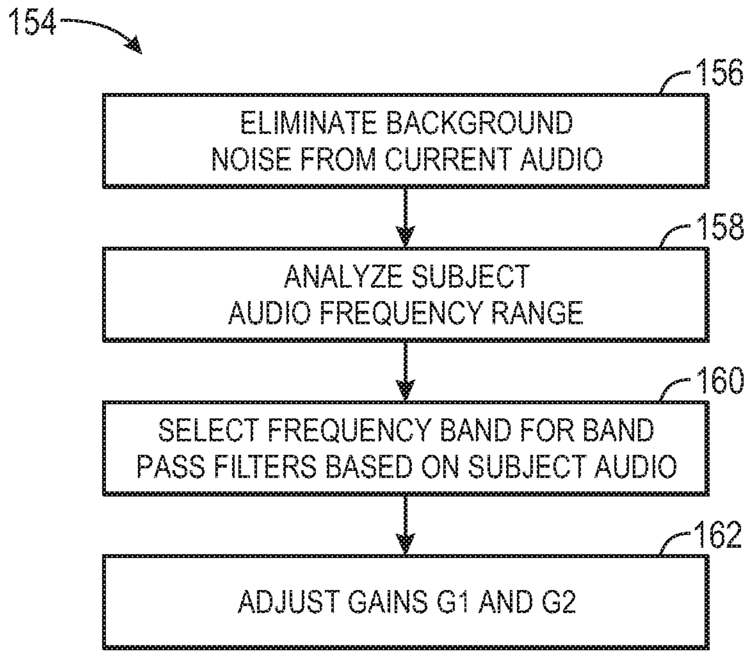
FIG. 11 is a flowchart describing another embodiment of a method for carrying out the process of FIG. 9.

Turning to FIG. 11, a flowchart 154 describes an embodiment of another method for operating the stereo-to-mono block 54 of FIG. 9. In step 156, the electronic device 10 may process the audio file from which the L and R audio signals derive to eliminate background noise. The background noise may be substantially eliminated using any technique suitable to produce a single subject audio component substantially without the background noise. In step 158, the subject audio component of the audio file may be analyzed to determine a general frequency range of the subject audio. For example, after the background noise has been substantially eliminated from the currently-playing audio, the subject audio component that remains may be a male or female voice signal. Thus, the frequency range of the subject audio may be that of a male or female voice. In step 160, this information may be provided to the logic 138, which may select the frequency band of the band pass filters 128 and 132 to encompass the frequency range of the subject audio component. After the logic 138 has tuned the band pass filters 128 and 132, in step 162, the logic 138 may adjust the gains G1 and G2 of the gain blocks 140 and 142 using the techniques described above with reference to FIGS. 5 and/or 8.

Figure 12:
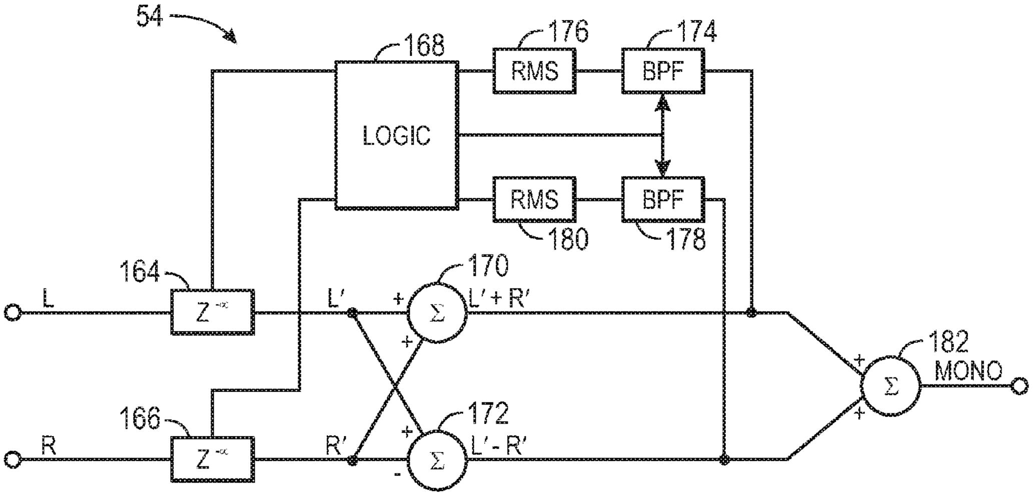
FIG. 12 is a schematic diagram of a process for stereo-to-mono signal determination for use with the system of FIG. 3, in accordance with an embodiment.

In the embodiments described above, phase differences between certain frequency components of the L and R signals are reduced by adjusting the quantity of the summation signal L+R and the difference signal L−R to produce the output mono signal. In FIG. 12, a stereo-to-mono block 54 for use in the system 50 of FIG. 3 employs delay blocks 164 and 166 to correct for phase differences between the L and R signals. The embodiment of the stereo-to-mono block 54 of FIG. 12 may be implemented using hardware, such as a digital signal processor (DSP) of the electronic device 10, software running on the processor(s) 12, firmware associated with any suitable component of the electronic device 10, or any combination thereof. In the stereo-to-mono block 54 illustrated in FIG. 12, the delay blocks 164 and 166 may be controlled by logic 168 to reduce phase cancellation when the L and R channels are mixed. As described below, the logic 168 may introduce a delay to either the L signal, the R signal, or both the L and the R signal such that at least one or more target frequency bands of the L signal and R signal are largely in phase or out of phase. The resulting signals may be represented as L' and R' signals. When the logic 168 introduces a delay to cause the L' and R' signals to become either largely in phase or largely out of phase, when the L' and R' signals are added in a summation block 170 to produce a summation signal L'+R', or when the L' and R' signals are subtracted in a difference block 172 to produce a difference signal L'−R', one of these signals may be maximized relative to the other. In other words, when the L' and R' signals are largely in phase, the L'−R' signal may be near to zero, and when the L' and R' signals are largely out of phase, the L'+R' signal may be near to zero. Thus, depending on whether the L' and R' signals are largely in phase or out of phase, the L'+R' or L'−R' signals may be output as the mono signal.

To this end, the L'+R' audio signal may enter a band pass filter (BPF) 174 before entering a root means squared (RMS) block 176, and the L−R audio signal may enter a band pass filter (BPF) 178 before entering a root means squared (RMS) block 180. The result of these signals may be considered by the logic 168, which, based on these signals, may adjust the delay introduced by the delay blocks 164 and 166. Although the band pass filters 174 and 178 may not be used, if the band pass filters 174 and 178 are included, the logic 168 may also select a frequency band of interest to the user based on the techniques disclosed above with reference to FIGS. 10 and 11. A summation block 182 may combine the L'+R' audio signal with the L'−R' audio signal to produce the output mono signal. In general, when the logic 168 has adjusted the delays of delay blocks 164 and 166, the L'+R' audio signal or the L'−R' audio signal may be maximized relative to the other. In this way, the output mono signal may include substantially all of the information provided by the L and R channels despite that the L and R channels may be out of out-of-phase by a from one another. It should further be understood that gain blocks may be applied to the L'+R' audio signal and/or the L'−R' audio signal prior to summation in the summation block 182. If such gain blocks are applied, the logic 168 may adjust the gain blocks in the manners described above with reference to FIGS. 5-8.

Figure 13:
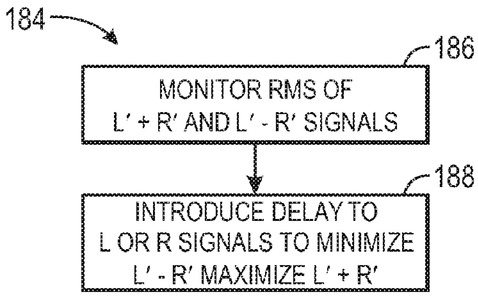
FIG. 13 is a flowchart describing an embodiment of a method for carrying out the process of FIG. 12.

A flowchart 184 of FIG. 13 describes an embodiment of a method for operating the stereo-to-mono block 54 illustrated in FIG. 12. In a first step 186, the logic 168 may monitor the RMS power or Fourier transform levels of the L'+R' and L'−R' audio signals. In step 188, the logic 168 may introduce delays to either the L or R audio signals to minimize the RMS power or Fourier transform level of the L'−R' audio signal and to maximize the RMS power or Fourier transform level of the L'+R' audio signal. Alternatively, the logic 168 may introduce delays to the L or R audio signals to maximize the L'−R' audio signal and to minimize the L'+R' audio signal in step 188. It should be appreciated that carrying out step 188 may involve the implementation of any suitable control technique, such as a closed-loop control technique, which may consider feedback from the L'+R' audio signals and L'−R' audio signals to adjust the delay(s) of the delay blocks 164 and/or 166.

Figure 14:
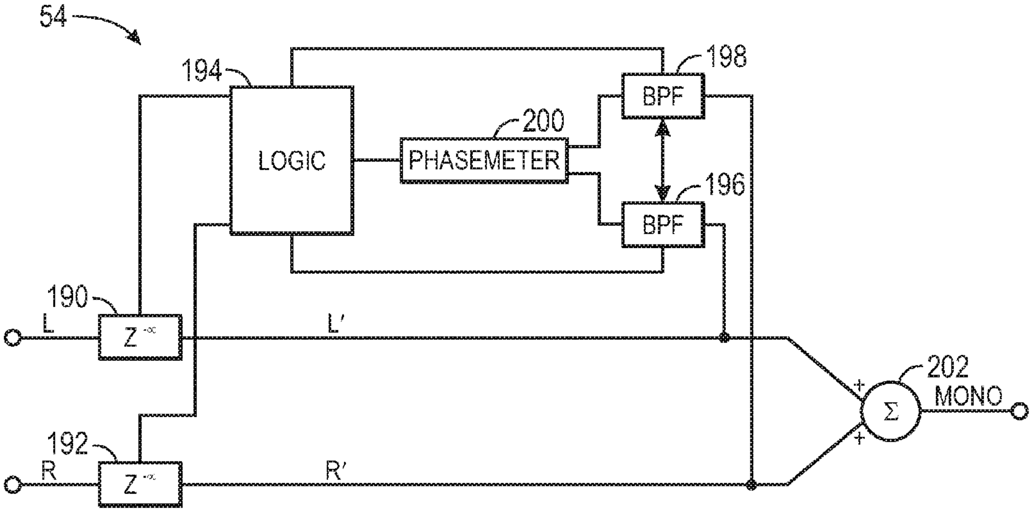
FIG. 14 is a schematic diagram of a process for stereo-to-mono signal determination for use by the system of FIG. 3, in accordance with an embodiment.

FIG. 14 represents an alternative embodiment of the stereo-to-mono block 54 illustrated in FIG. 12. Like the embodiments described above, the stereo-to-mono block 54 of FIG. 14 may be implemented using hardware, such as a digital signal processor (DSP) of the electronic device 10, software running on the processor(s) 12, firmware associated with any suitable component of the electronic device 10, or any combination thereof. In addition, however, the stereo-to-mono block 54 may be implemented using at least one electronic component that may supplement software running on the processor(s) 12. In particular, a phasemeter may be used to determine a phase difference between the L and R channels. Such a phasemeter may represent a discrete electronic component and/or a function of a digital signal processor (DSP).

In the stereo-to-mono block 54 of FIG. 14, the L channel and the R channel may respectively enter delay blocks 190 and 192. As described above with reference to FIG. 12, the delay blocks 190 and 192 may introduce a time delay to either or both of the L and R channels. Logic 194 may control the amount of delay provided by the delay blocks 190 and/or 192 such that the resulting L' and R' audio signals are largely in phase with one another. In general, at least one particular frequency component of the L' and R' signals may be in phase with one another. To reduce phase cancellation between the L channel and the R channel, the L' and R' channels may respectively enter band pass filters 196 and 198. Although in some embodiments the band pass filters 196 and 198 may not be present, in certain embodiments, the logic 194 may select the frequency band of the band pass filters 196 and 198 using the techniques described above with reference to FIGS. 10 and 11. The filtered L' and R' audio channels may be compared in a phasemeter 200, which may provide to the logic 194 an indication of a phase relationship between the L' and R' channels. Based on this phase relationship, the logic 194 may adjust the delay introduced to the L and/or R channels via the delay blocks 190 and 192. When a proper amount of delay has been introduced, the L' and R' channels may be largely in-phase, and when added together in a summation block 202, the output mono signal may be substantially free of phase cancellation in the frequency range of interest.

Figure 15:
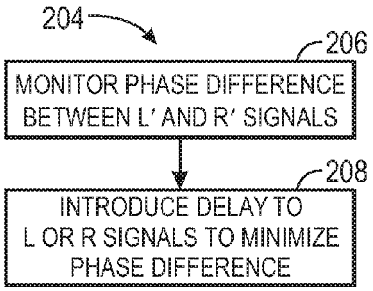
FIG. 15 is a flowchart describing an embodiment of a method for carrying out the process of FIG. 14.

FIG. 15 illustrates a flowchart 204, which describes an embodiment of a method for operating the stereo-to-mono block 54 of FIG. 14. In step 206, the phasemeter 200 may monitor phase differences between the L' and R' signals. In step 208, the logic 194 may determine an amount of delay to adjust or maintain the current phase relationship between the L' and R' audio signals. The logic 194 may include any suitable closed-loop control technique to introduce a proper amount of delay to the L and R audio signals, such that the L' and the R' audio signals are substantially in-phase in the frequency band of interest.

Figure 16:
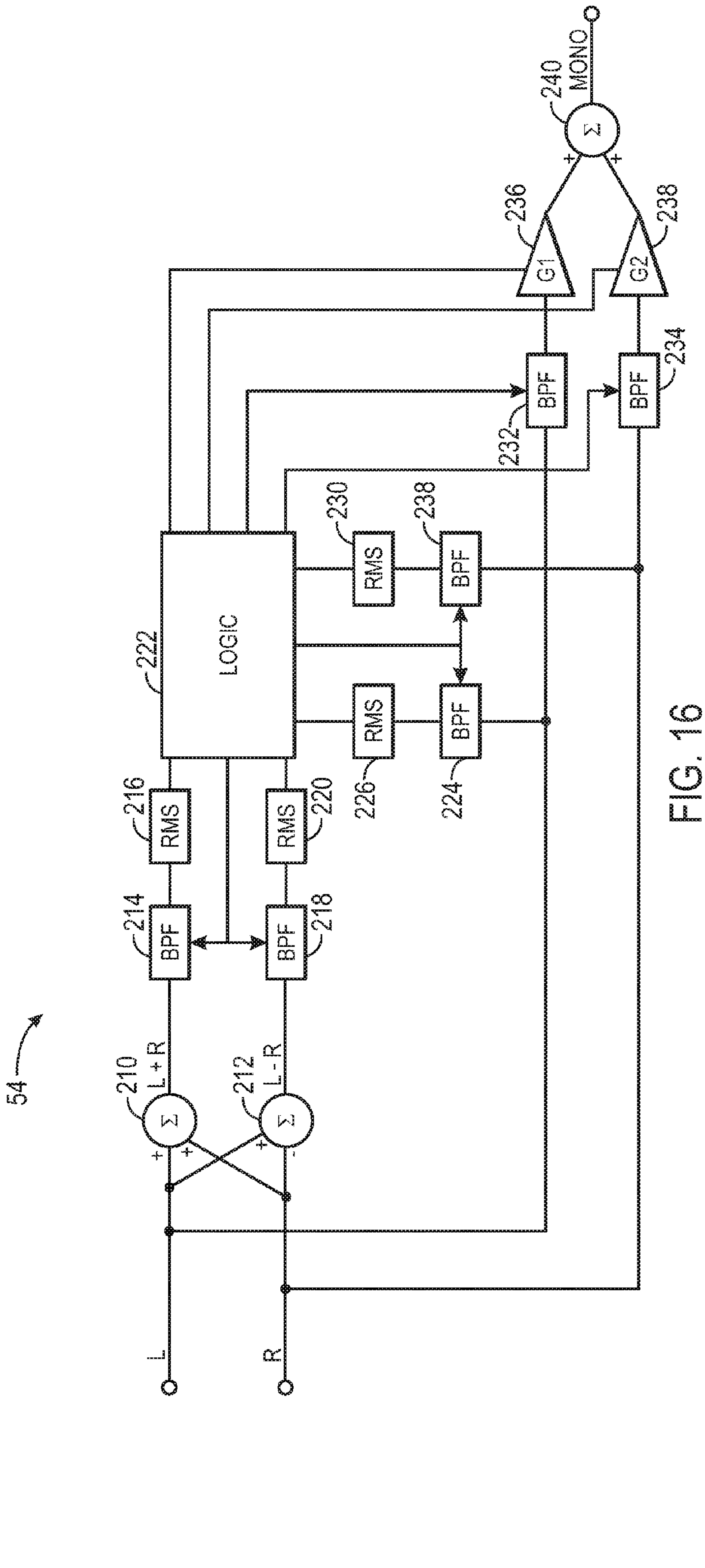
FIG. 16 is a schematic diagram of a process for stereo-to-mono signal determination for use by the system of FIG. 3, in accordance with an embodiment.

FIG. 16 illustrates another embodiment of the stereo-to-mono block 54 for use with the system 50 of FIG. 3. The stereo-to-mono block 54 illustrated in FIG. 16 may be implemented using hardware, such as a digital signal processor (DSP) of the electronic device 10, software running on the processor(s) 12, firmware associated with any suitable component of the electronic device 10, or any combination thereof. In the stereo-to-mono block 54 of FIG. 16, the L and R channels may be summed and differenced in a summation block 210 and a difference block 212, respectively, to produce the L+R and L−R audio signals. The L+R audio signal may enter a band pass filter 214 before entering a root means squared (RMS) block 216. The L−R audio signal may enter a band pass filter 218 before entering a root means squared (RMS) block 220. These signals may be assessed by logic 222 to reduce phase cancellation that may result when the L and R audio signals are summed.

Additionally, the L and R audio signals may also be considered by the logic 222. The L signal may enter a band pass filter (BPF) 224 and a root mean squared (RMS) block 226, and the R signal may enter a band pass filter (BPF) 228 and a root mean squared (RMS) block 230. These resulting signals may also be considered by the logic block 222. It should be understood that the band pass filters 214, 218, 224, and/or 228 may be static filters, or may be dynamically selected using the techniques described above with reference to FIGS. 10 and 11.

Based on the RMS levels of the filtered L+R, L−R, L, and R audio signals, the logic 222 may apply a band stop filter (BSF) 232 or 234 to the L and/or R audio signals. The resulting signals may respectively enter gain blocks 236 and 238, before being summed in a summation block 240 to produce the output mono signal. The band stop filters 232 and/or 234 may exclude audio in the frequency range of interest that may otherwise result in phase cancellation when the L and R audio channels are summed. In other words, band stop filters 232 and/or 234 may eliminate out-of-phase components from either the L or R audio signal. Additionally or alternatively, gains G1 and G2 of the gains blocks 236 and 238 may be adjusted by the logic 222 to compensate for audio volume lost when the band stop filters 232 and/or 234 are applied.

Figure 17:
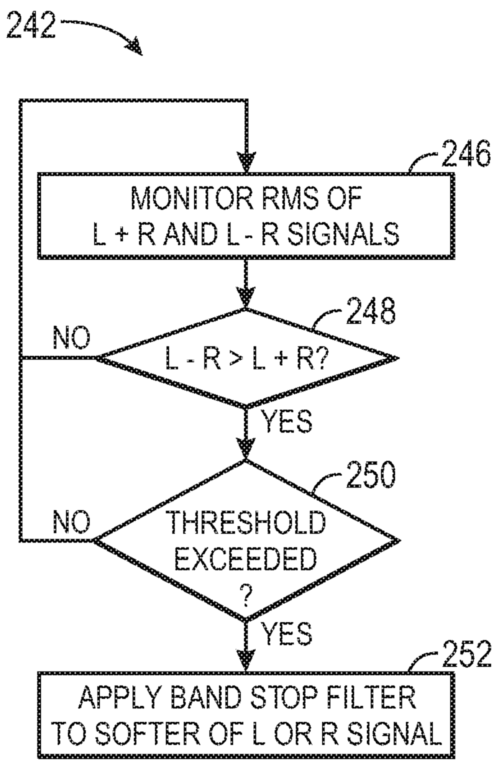
FIG. 17 is a flowchart describing an embodiment of a method for carrying out the process of FIG. 16.
Figure 18:
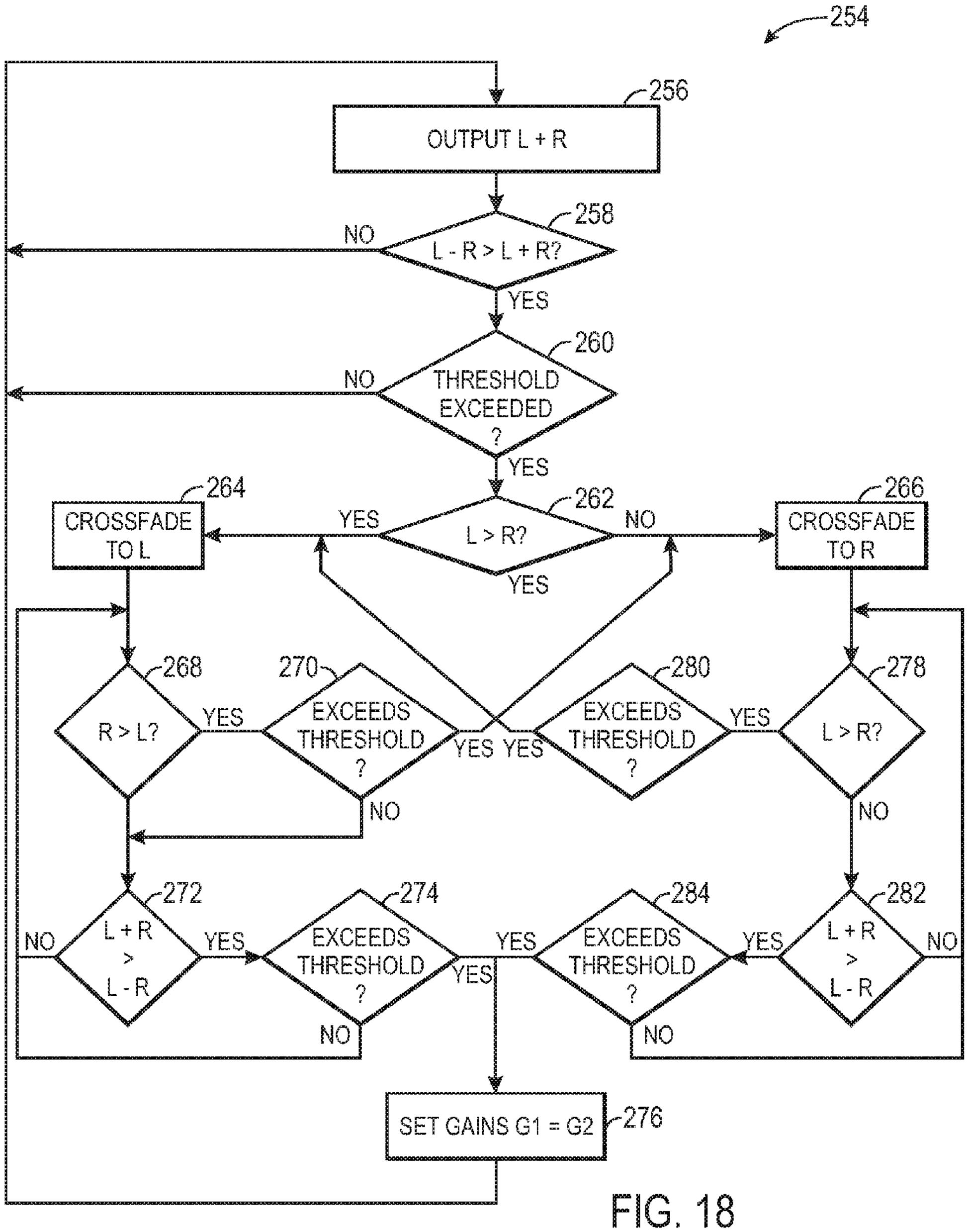
FIG. 18 is a flowchart describing another embodiment of a method for carrying out the process of FIG. 16.

FIGS. 17 and 18 describe embodiments of methods for operating the stereo-to-mono block 54 of FIG. 16. Turning first to FIG. 17, a flowchart 242 describes an embodiment of a method for applying the band stop filters 232 and/or 234 to the L and/or R audio channels to reduce phase cancellation that would otherwise result when the L and R audio signals are summed. In a first step 246, the logic 222 may monitor the RMS power or Fourier transform levels of the L+R and L−R audio signals. As discussed above, when the L+R audio signal exceeds that of the L−R audio signal, the L and R audio signals generally are more in-phase than out-of-phase. On the other hand, when the L−R audio signal power level exceeds that of the L+R audio signal, the L and R audio signals generally are more out-of-phase than in-phase.

As such, as indicated by decision blocks 248 and 250, if the L−R audio signal RMS power or Fourier transform level exceeds that of the L+R audio signal by a threshold amount of time and/or power, the logic 222 may perform step 252. In step 252, the logic 222 may apply a band stop filter to the L or R audio channels. In particular, the logic 222 may apply the band stop filter 232 and/or 234 to only the softer of the L or R audio signal as determined by the RMS level of the frequency band of interest of the L or R audio signal. In some embodiments, the logic 222 may further adjust the gains G1 and G2 of gain blocks 236 and 238 to compensate for the lost audio content resulting from the application of the band stop filter 232 and/or 234. In particular, if the band stop filter 232 is applied, the gain G2 of the gain block 238 may be increased to compensate for the lost audio content of the frequency band that has been excluded from the L channel. Similarly, if the band stop filter 234 has been applied to the R channel, the gain G1 of gain block 236 may be increased relative to the gain G2.

FIG. 18 illustrates a flowchart 254 describing an embodiment of a method for operating the stereo-to-mono block 54 of FIG. 16 by adjusting the gains G1 and G2 of gain blocks 236 and 238 to the L and R audio signals. The stereo-to-mono block 54 may avoid outputting a distorted mono signal, which may be caused by phase cancellation when the L and R channels are summed, by outputting the L+R audio signal as the mono signal only when the in-phase components of the L and R channels outweigh the out-of-phase components. When the out-of-phase components of the L and R channels outweigh the in-phase components, the stereo-to-mono block 54 may output only the L or R audio channel as the mono signal.

In a first step 256, the logic 222 may have deactivated the band stop filters 232 and/or 234, and may have set the gains G1 and G2 of the gain blocks 236 and 238 to be approximately equal, such that the output mono signal is equal to the sum of the L and R audio channels. As illustrated by decision blocks 258 and 260, if the RMS power or Fourier transform of the L−R audio signal exceeds that of the L+R audio signal for a threshold amount of time or by a threshold amount of power, the process may flow to a decision block 262. It should be understood that, when the RMS power or Fourier transform of the L−R audio signal exceeds that of the L+R audio signal, the L and R audio signals are more out-of-phase than in-phase. As such, merely summing the audio signals L and R together may produce a distorted audio signal due to phase cancellation.

In the decision block 262, the logic 222 may consider whether the RMS power or Fourier transform of the L signal exceeds that of the R signal. If so, the logic 222 may set the gains G1 and G2 over time to crossfade to output substantially only the L channel as the output mono signal. On the other hand, if the RMS power or Fourier transform of the L channel is less than that of the R channel, the logic 222 may set the gains G1 and G2 over time to crossfade to output substantially only the R channel as the output mono signal.

After crossfading to output substantially only the L audio channel in step 264, the logic 222 may consider whether to instead crossfade to the R audio channel. As indicated by decision blocks 268 and 270, if the RMS power or Fourier transform of the R audio channel exceeds that of the L audio channel over a threshold period of time or by a threshold amount of RMS power or Fourier transform, the process may flow to step 266, and the logic 222 may crossfade to output substantially only the R audio channel. If not, as illustrated by decision blocks 272 and 274, the logic 222 may consider whether the RMS power or Fourier transform level of the L+R audio signal exceeds that of the L−R audio signal for a threshold amount of time or by a threshold amount of power. Such a situation may indicate that, in the frequency band of interest, the L and R audio signals are more in-phase than out-of-phase with one another. As such, in step 276, the logic 222 may set the gains G1 and G2 to be substantially equal to one another such that the L and R audio components are summed together in the summation block 240 to produce the output mono signal. Step 276 may involve crossfading over time to include both channels L and R in equal proportions in the output mono signal.

Similarly, after crossfading to output substantially only the R audio channel in step 266, in decision blocks 278 and 280 the logic 222 may consider whether the RMS power or Fourier transform of the L audio channel has exceeded that of the R audio signal for a threshold period of time or by a threshold amount of power. If so, the logic 222 may crossfade to output substantially only the L audio channel in step 264. If not, the logic 222 may subsequently determine whether the L+R audio signal power exceeds that of the L−R audio signal for a threshold period of time or by a threshold amount of power. If so, the process may flow to step 276 and the logic 222 may set the gains G1 and G2 to be approximately equal to one another, such that the output mono signal is approximately equivalent to L+R.

Figure 19:
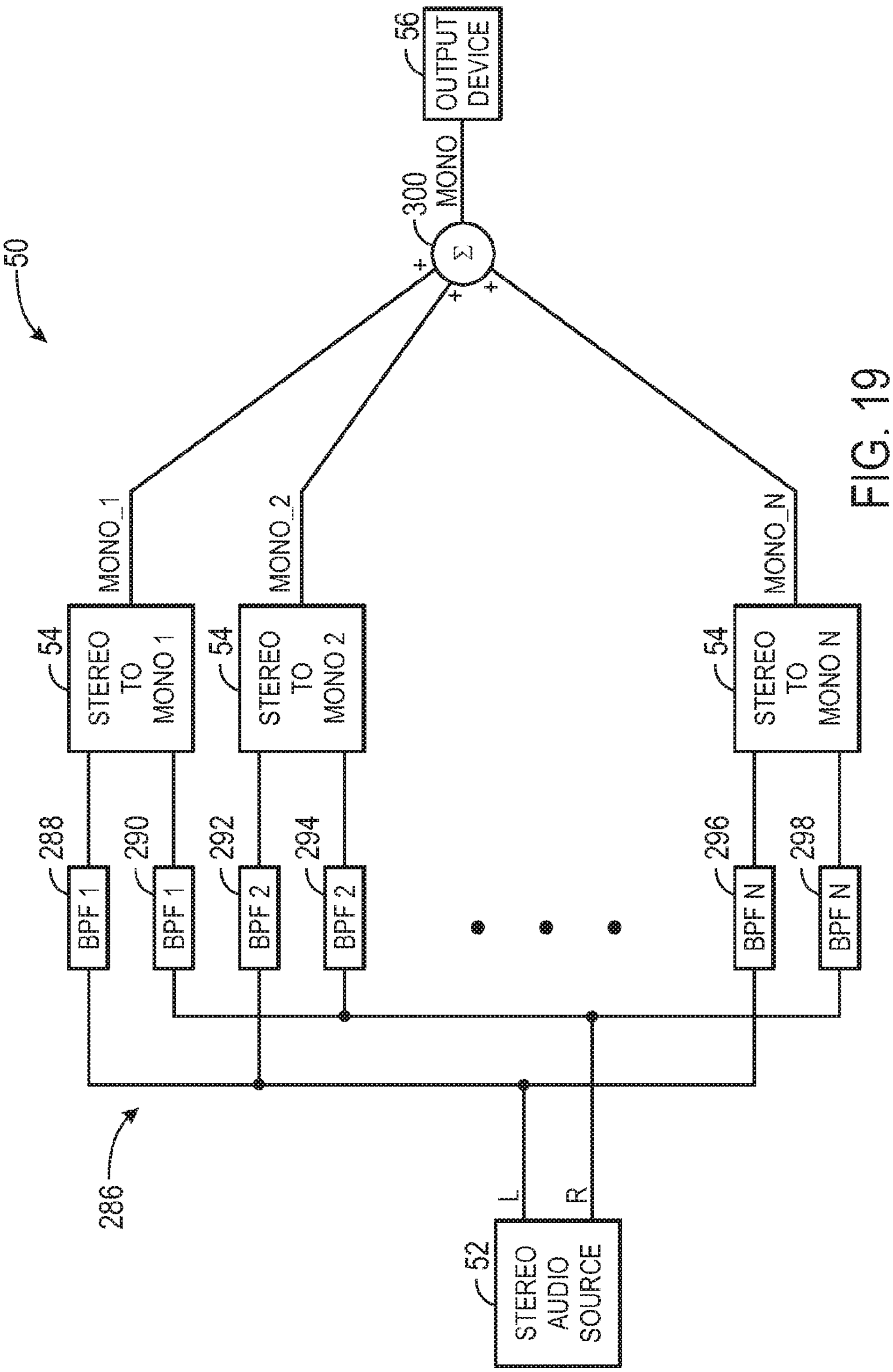
FIG. 19 is a block diagram depicting another stereo-to-mono processing system of the device of FIG. 1, in accordance with an embodiment.

In the foregoing discussion, various embodiments of the stereo-to-mono block 54 have been provided. FIG. 19 represents an alternative embodiment of the system 50 involving multiple stereo-to-mono blocks 54, each of which may convert a particular frequency band of the L and R audio channels to a mono signal individually. Like the system 50 of FIG. 3, the system figure of FIG. 19 includes the stereo audio source 52 to provide left and right audio signals and the output device 56 to receive the output mono signal. In place of a single stereo-to-mono block 54, the system 50 illustrated in FIG. 19 employs a multi-band stereo-to-mono block 286.

The L and R audio channels may be divided into various frequency bands of interest by way of a first pair of band pass filters 288 and 290, a second pair of band pass filters 292 and 294, and so forth, up to an $N^{th}$ pair of band pass filters 296 and 298. A corresponding series of stereo-to-mono blocks 54, labeled 1-N, may individually determine a mono output signal from the band-pass-filtered L and R audio signals. The stereo-to-mono blocks 54 may represent any stereo-to-mono processing circuitry and/or software, and may include, for example, the embodiments of the stereo-to-mono blocks 54 described above.

Generally, the band pass filters 288-298 may be selected such that the frequency bands generally may not overlap. As such, the resulting mono signals output by the stereo-to-mono blocks 54, labeled mono_1, mono_2, . . . , mono_N, individually only may include non-overlapping frequencies. These mono signals may be summed in a summation block 300 to produce the final output mono signal, which may be sent to the output device 56.

Figure 20:
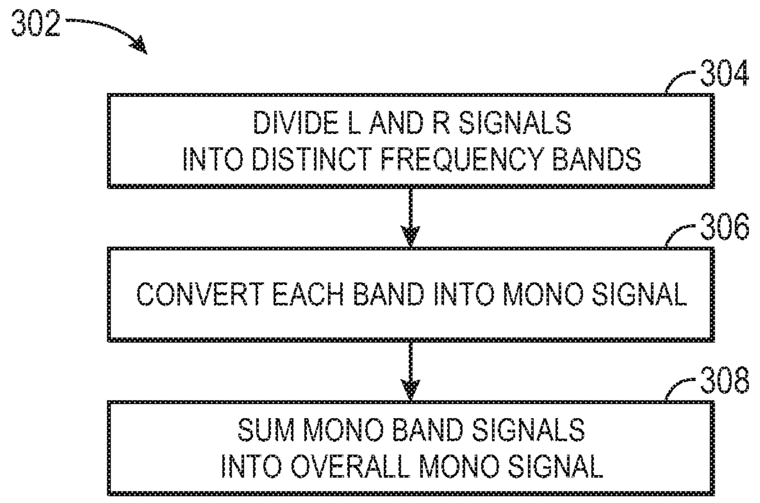
FIG. 20 is a flowchart describing an embodiment of a method for operating the system of FIG. 19.

FIG. 20 is a flowchart 302 describing an embodiment of a method for operating the system 50 of FIG. 19. In a first step 304, L and R audio signals from the stereo audio source 52 may be divided into descent frequency bands of interest using the band pass filters 288-298. In some embodiments, the number of frequency bands and the values thereof may be selected dynamically based on characteristics of the audio signal, in manners similar to those described with reference to FIGS. 10 and 11. In step 306, the stereo-to-mono blocks 54 may convert each frequency band into a descent mono signal of that frequency band. In step 308, the various mono output signals of the descent frequency bands may be summed together to produce the final mono output signal.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:

a dual-channel digital audio source configured to provide a first digital audio channel signal and a second digital audio channel signal from a digital audio file;

data processing circuitry configured to receive the first digital audio channel signal and the second digital audio channel signal and to output a monaural digital audio signal that includes components of the first digital audio channel signal and the second digital audio channel signal, wherein the data processing circuitry is configured to determine the monaural digital audio signal based at least in part on a phase relationship between a portion of the first digital audio channel signal of a frequency band and a portion of the second digital audio channel of the frequency band, wherein the monaural digital audio signal is a summation of the components of the first and second digital audio channel signals only when a power of the summation of the first digital audio channel signal and the second digital audio channel signal exceeds a power of a difference between the first digital audio channel signal and the second digital audio channel signal; and an output device configured to receive and output the monaural digital audio signal.

2. The electronic device of claim 1, wherein the data processing circuitry is configured to select the frequency band based at least in part on metadata associated with the digital audio file.

3. The electronic device of claim 1, wherein the data processing circuitry is configured to select the frequency band based at least in part on a genre of the digital audio file.

4. The electronic device of claim 1, wherein the data processing circuitry is configured to determine a frequency range of interest to a user of the electronic device and to select the frequency band based at least in part on the frequency range.

5. The electronic device of claim 1, wherein the data processing circuitry is configured to determine the monaural digital audio signal by applying a band stop filter of the frequency band to the softer of the first digital audio channel signal and the second digital audio channel signal.

6. A system comprising:

a digital audio source configured to provide digital audio having at least two audio channels; and an electronic device configured to receive the digital audio from the digital audio source, to change a relative timing between a first of the at least two audio channels and a second of the at least two audio channels based at least in part on a phase relationship between the first and the second of the at least two audio channels such that a power of a summation of the first and the second of the at least two audio signals substantially exceeds a power of a difference between the first and the second of the at least two audio signals, and to output a monaural audio signal based at least in part on the first and the second of the at least two audio channels.

7. The system of claim 6, wherein the electronic device is configured to determine the phase relationship between the first and the second of the at least two audio channels based at least in part on a comparison between the power of the summation of the first and the second of the at least two audio channels and the power of the difference between the first and the second of the at least two audio channels.

8. The system of claim 6, wherein the electronic device is configured to determine the phase relationship between the first and the second of the at least two audio channels using a phasemeter.

9. The system of claim 6, wherein the electronic device is configured to change the relative timing between the first and the second of the at least two audio channels based at least in part on a phase relationship between a portion of the first of the at least two audio channels of a frequency band and a portion of the second of the at least two audio channels of the frequency band.

10. A method comprising:

receiving, into a processor, a first digital audio channel signal and a second digital audio channel signal; and outputting a monaural digital audio signal that includes components of the first digital audio channel signal and the second digital audio channel signal, wherein the monaural digital audio signal is based at least in part on a phase relationship between a portion of the first digital audio channel signal of a frequency band and a portion of the second digital audio channel of the frequency band, wherein the monaural digital audio signal is a summation of the components of the first and second digital audio channel signals only when a power of the summation of the first digital audio channel signal and the second digital audio channel signal exceeds a power of a difference between the first digital audio channel signal and the second digital audio channel signal.

11. The method of claim 10, wherein the monaural digital audio signal is determined based at least in part on a phase relationship between a portion of the first digital audio channel signal of a frequency band and a portion of the second digital audio channel of the frequency band.

12. The method of claim 10, wherein the frequency band is selected based at least in part on metadata associated with the first audio channel signal and the second audio channel signal.

13. The method of claim 10, wherein the frequency band based at least in part on a genre of a digital audio file associated with the first audio channel signal and the second audio channel signal.

14. The method of claim 10, further comprising:

determining a frequency range of interest to a user; and selecting the frequency band based at least in part on the frequency range.

15. The method of claim 10, further comprising:

applying a band stop filter of the frequency band to the softer of the first digital audio channel signal and the second digital audio channel signal to determine the monaural digital audio signal.

* * * * *